A. W. BALCH, Jr.
BAIT HOLDER.
APPLICATION FILED MAY 11, 1912.
1,076,542.
Patented Oct. 21, 1913.
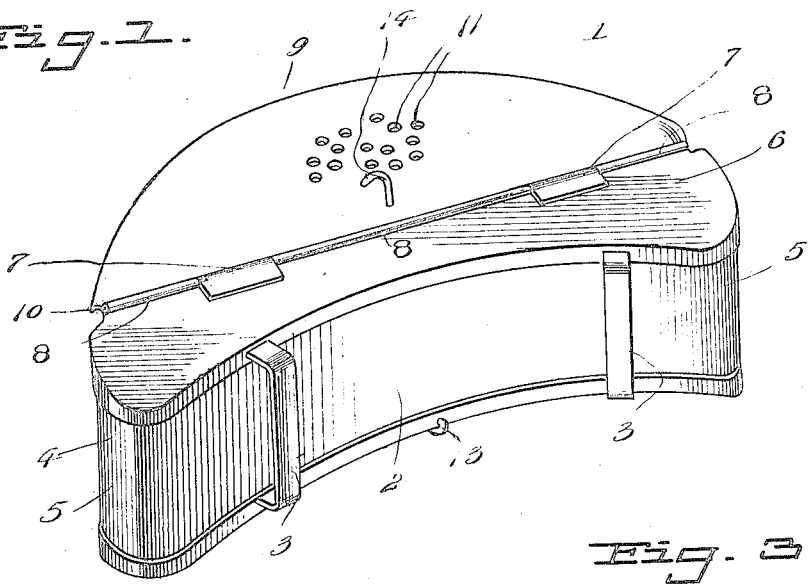
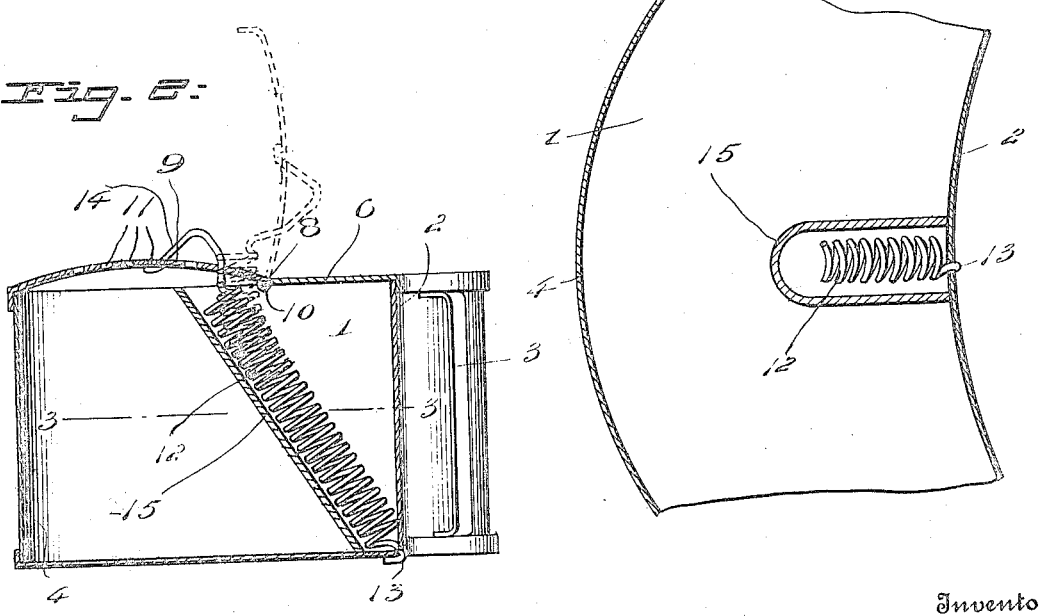
Witnesses
Inventor
A. W. Balch Jr.
By Victor J. Evans
Attorney

UNITED STATES PATENT OFFICE.

AUGUSTUS W. BALCH, JR., OF MATAMORAS, PENNSYLVANIA.

BAIT-HOLDER.

1,076,542.

Specification of Letters Patent.   Patented Oct. 21, 1913.

Application filed May 11, 1912.   Serial No. 696,743.

*To all whom it may concern:*

Be it known that I, AUGUSTUS W. BALCH, Jr., a citizen of the United States, residing at Matamoras, in the county of Pike and State of Pennsylvania, have invented new and useful Improvements in Bait-Holders, of which the following is a specification.

This invention relates to bait holders and has for an object to provide a holder which is particularly designed for use in carrying worms, minnows or like bait and aims to include in its construction a closure which may be automatically brought to a closed position to properly seal the holder and thereby preserve the bait in a fresh and moist condition for a considerable period of time.

In the drawing forming a portion of this application, and in which like letters of reference indicate similar parts in the several views: Figure 1 is a perspective view of the bait holder. Fig. 2 is a transverse section therethrough showing the cover closed in full lines and opened in dotted lines. Fig. 3 is a section on line 3—3 of Fig. 2.

The bait holder comprises a receptacle 1 whose inner wall 2 is of arcuate configuration so as to adapt itself to the waist of the wearer, the receptacle having the said wall 2 provided with loops 3 to receive a belt or the like whereby the holder may be properly supported upon the person. The front wall 4 of the receptacle is also of arcuate configuration and it gradually merges as at 5 into the inner wall 2. The top 6 is provided with hinge knuckles 7 which are associated with similar hinge knuckles 8 upon a closure 9, a pin 10 being extended through all of the knuckles whereby the closure can be readily adjusted to opened and closed positions.

A cover 9 is provided with suitable ventilating perforations 11 therein. A retractile spring 12 is located in the receptacle, the lower end of the spring is secured as at 13 to the bottom of the receptacle, while the opposite end of the spring is extended through one of the ventilating perforations of the closure and then bent upwardly to form a manipulating eye or loop 14 and then finally extended into another one of the perforations 11 as clearly shown. From this construction it is evident that under the action of the spring described the closure 9 will be yieldingly held against the open end of the receptacle and in this manner the bait may be kept in a moist condition and preserved for a considerable length of time. A guard 15 is located in the receptacle and arranged in embracing relation upon the spring so as to prevent the latter under its expansion and contraction from agitating or disturbing the bait.

I claim:—

A bait receptacle having a bottom, front and rear walls, a closure hinged to the said receptacle, means secured to the rear wall of said receptacle and engaged with the central portion of said closure for normally retaining the latter in closed position, the portion of said means engaging said cover, projecting exteriorly thereof, and serving as a manipulator for said closure, and means disposed interiorly of said receptacle and in a forwardly and upwardly inclined position for guarding the first mentioned means throughout its entire length from the contents of the receptacle and preventing the same from becoming inoperative.

In testimony whereof I affix my signature in presence of two witnesses.

AUGUSTUS W. BALCH, JR.

Witnesses:
  KATHERINE M. ROHN,
  H. W. RASENCRANCE.